(12) United States Patent
Sim et al.

(10) Patent No.: US 10,030,727 B2
(45) Date of Patent: Jul. 24, 2018

(54) ELECTRO-MECHANICAL BRAKE DEVICE

(71) Applicant: HYUNDAI MOBIS CO., LTD., Seoul (KR)

(72) Inventors: Dong Guk Sim, Seoul (KR); Choong Sik Shin, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/375,785

(22) Filed: Dec. 12, 2016

(65) Prior Publication Data

US 2017/0167553 A1 Jun. 15, 2017

(30) Foreign Application Priority Data

Dec. 14, 2015 (KR) .......................... 10-2015-0178083

(51) Int. Cl.
| | | |
|---|---|---|
| *B60T 13/74* | (2006.01) | |
| *F16D 65/18* | (2006.01) | |
| *F16D 121/24* | (2012.01) | |
| *F16D 125/52* | (2012.01) | |

(52) U.S. Cl.
CPC ............ *F16D 65/18* (2013.01); *B60T 13/741* (2013.01); *F16D 2121/24* (2013.01); *F16D 2125/52* (2013.01)

(58) Field of Classification Search
CPC ....... F16D 65/18; F16D 55/225; B60T 13/741
USPC .................. 188/2 D, 72.3, 158–164
See application file for complete search history.

(56) References Cited

U.S. PATENT DOCUMENTS

| | | | | |
|---|---|---|---|---|
| 7,205,688 B2* | 4/2007 | Otaki | ...................... | F16D 65/18 |
| | | | | 188/156 |
| 8,235,181 B2* | 8/2012 | Sano | ..................... | B60T 13/746 |
| | | | | 188/156 |
| 9,752,635 B2* | 9/2017 | Bahmata | ................. | F16D 65/18 |
| 2004/0195058 A1* | 10/2004 | Ina | .......................... | F16D 65/18 |
| | | | | 188/158 |
| 2011/0147143 A1 | 6/2011 | Park | | |
| 2013/0133989 A1* | 5/2013 | Iida | .......................... | B61H 5/00 |
| | | | | 188/72.3 |
| 2014/0034432 A1* | 2/2014 | Bull | ...................... | B60T 13/741 |
| | | | | 188/106 R |
| 2015/0354650 A1* | 12/2015 | Bull | ....................... | F16D 65/18 |
| | | | | 188/162 |

FOREIGN PATENT DOCUMENTS

KR 10-2011-0072877 6/2011

\* cited by examiner

*Primary Examiner* — Christopher P Schwartz
(74) *Attorney, Agent, or Firm* — H.C. Park & Associates, PLC (57) ABSTRACT

An electro-mechanical brake device may include: a driver configured to generate rotary power; a first gear connected to an output shaft of the driver, and the first gear configured to rotate with the output shaft; a second gear installed in a direction crossing the first gear, engaged with the first gear, and configured to rotate with the first gear; a third gear engaged with the second gear and configured to rotate with the second gear, the third gear having a rotating gear bar installed in parallel to the output shaft and configured to rotate with the output shaft; a moving nut engaged with the third gear and configured to move linearly; and a piston installed in a shape covering an outside of the moving nut, and pushed by the moving nut so as to pressurize a brake pad.

13 Claims, 6 Drawing Sheets

ELECTRO-MECHANICAL BRAKE DEVICE

CROSS-REFERENCES TO RELATED APPLICATIONS

The present application claims priority from and the benefit of Korean Patent Application No. 10-2015-0178083, filed on Dec. 14, 2015, which is hereby incorporated by reference for all purposes as if set forth herein.

BACKGROUND

Field

Exemplary embodiments relate to an electro-mechanical brake device, and more particularly, to an electro-mechanical brake device capable of stably maintaining a parking brake force when a vehicle is parked, thereby improving operation reliability.

Discussion of the Background

In general, a brake system refers to a device which is used to decelerate or stop a running vehicle or used to maintain a parked state. The brake system uses a friction brake to perform a braking operation using a frictional force.

The above information disclosed in this Background section is only for enhancement of understanding of the background of the invention and, therefore, it may contain information that does not constitute prior art.

SUMMARY

Exemplary embodiments provide an electro-mechanical brake device configured to stably maintain a parking brake force when a vehicle is parked, thereby improving vehicle operation reliability.

In one exemplary embodiment, an electro-mechanical brake device may include: a driver configured to generate rotary power; a first gear connected to an output shaft of the driver, and the first gear configured to rotate with the output shaft; a second gear installed in a direction crossing the first gear, engaged with the first gear, and configured to rotate with the first gear; a third gear engaged with the second gear and configured to rotate with the second gear, the third gear having a rotating gear bar installed in parallel to the output shaft and configured to rotate with the output shaft; a moving nut engaged with the third gear and configured to move linearly; and a piston installed in a shape covering an outside of the moving nut, and pushed by the moving nut so as to pressurize a brake pad.

The driver may include an electrical motor, and is positioned above a caliper body.

The electro-mechanical brake device may further include a caliper cover coupled to the caliper body while covering the driver, the first gear, the second gear and the third gear.

The first gear may include a first worm gear which is installed outside the output shaft and extended in a horizontal direction.

The second gear may include: a first worm wheel gear engaged with the first gear and configured to rotate with the first gear, the first worm wheel gear having a rotating shaft positioned in a vertical direction; a connection member into which the rotating shaft connected to the first worm wheel gear is inserted, the connection member configured to rotate with the first worm wheel gear; and a second worm gear extended to the bottom of the connection member and having a screw thread formed thereon so as to be engaged with the third gear.

A top portion of rotating shaft may be extended upward through a center of rotation of the first worm wheel gear, and a bottom portion of the rotating shaft may have a polygonal cross-section.

The connection member may have a polygonal groove formed therein, such that the bottom portion of the rotating shaft is inserted into the polygonal groove.

The third gear may include: a second worm wheel gear installed in a ring shape, engaged with the second worm gear, and configured to rotate with the second worm gear; and a gear support supporting the inside of the second worm wheel gear, and having a center of rotation connected to the rotating gear bar.

The second worm wheel gear, the gear support and the rotating gear bar may be integrated with each other through injection molding.

The electro-mechanical brake device may further include: a bearing member installed on a first side of the gear support so as to reduce a frictional force; and a screw holder installed on a second side of the gear support, and fixed to the inside of the caliper body while restricting an axial movement of the second worm wheel gear. The third gear may be rotatably installed in the caliper body.

The screw holder may include: a holder body having a through-hole through which the rotating gear bar is passed, and formed in a ring shape; and edge fixing parts forming a plurality of air vent holes along an outer circumferential surface of the holder body.

The moving nut may include: a nut body into which the rotating gear bar is inserted, the nut body having an inner screw thread engaged with the rotating gear bar; and a locking member extended to the outside from one side of the nut body toward the piston, and restricted from rotating when locked to the inside of the piston.

When the rotating gear bar is configured to rotate, the locking member may be locked to the piston and restricted from rotating, and the moving nut may be moved linearly along a longitudinal direction of the rotating gear bar.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept and are incorporated in and constitute a part of this specification, illustrate exemplary embodiments of the invention, and together with the description serve to explain the principles of the inventive concept.

DETAILED DESCRIPTION OF EXEMPLARY EMBODIMENTS

Hereinafter, exemplary embodiments of the present invention will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present invention is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

A brake system may use a friction brake. The friction brake pressurizes a disk rotated with a wheel using a brake pad, and generates a frictional force between the disk and the brake pad, in order to perform a braking function. The friction brake is divided into a hydraulic brake and an electro-mechanical brake. Recently, the electro-mechanical brake is widely used. The electro-mechanical brake performs a braking operation as follows. When control receiving electronic pedal information drives a motor to generate axial torque, a piston is moved in the axial direction through a decelerator coupled to the motor, and the brake pad pressurizes the disk to perform the braking operation.

Conventional brake systems have a structure for supplying a parking force that includes an actuator positioned outside a caliper. Because the actuator is positioned outside the caliper, the actuator is exposed to exterior damage, such as external shock. Damage to the actuator may result in an unreliable or unstable parking brake force. Therefore, there is a demand for a brake system that is not susceptible to such damage.

Figure 1:
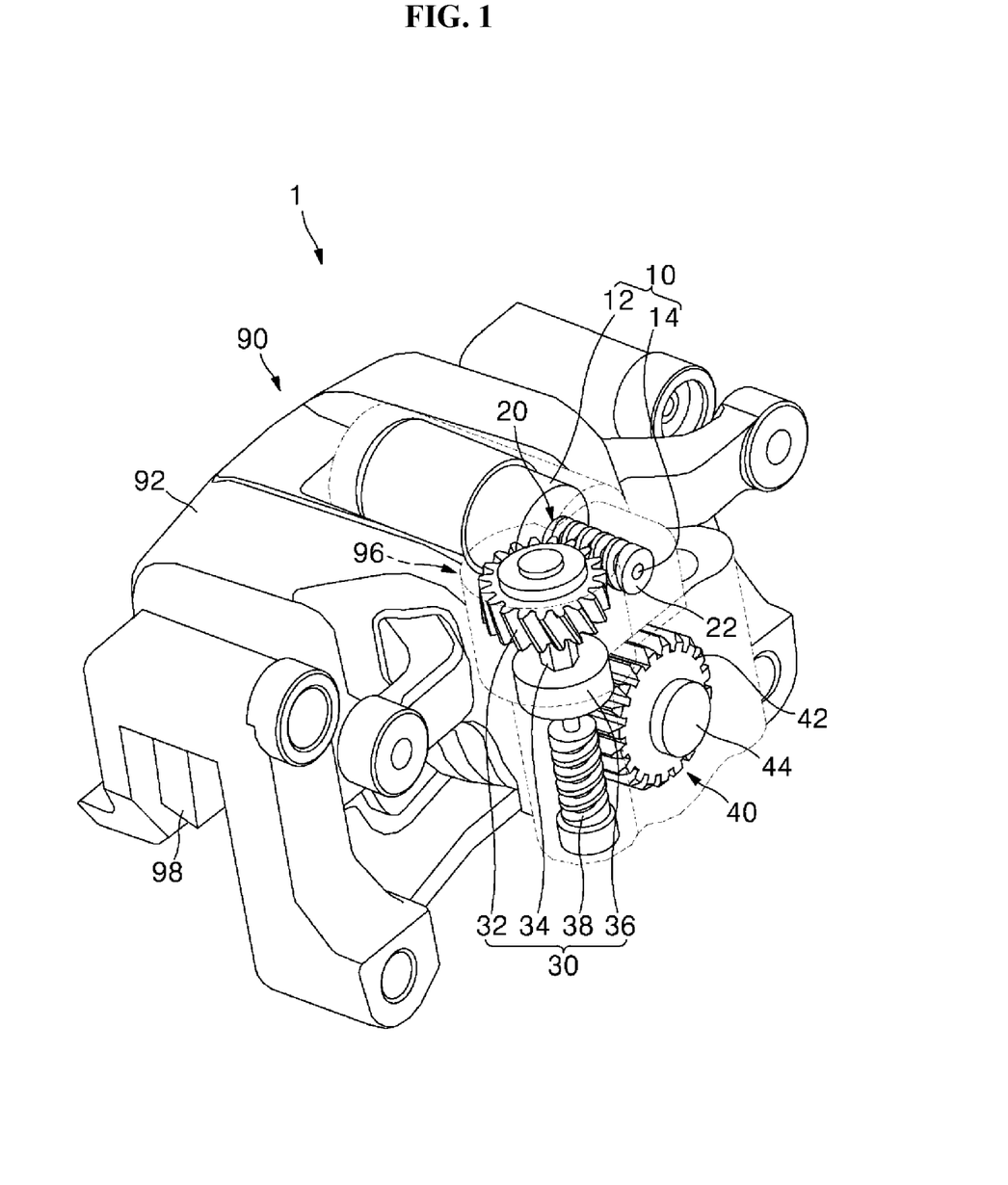
FIG. 1 is a perspective view schematically illustrating an electro-mechanical brake device in accordance with an exemplary embodiment.
Figure 2:
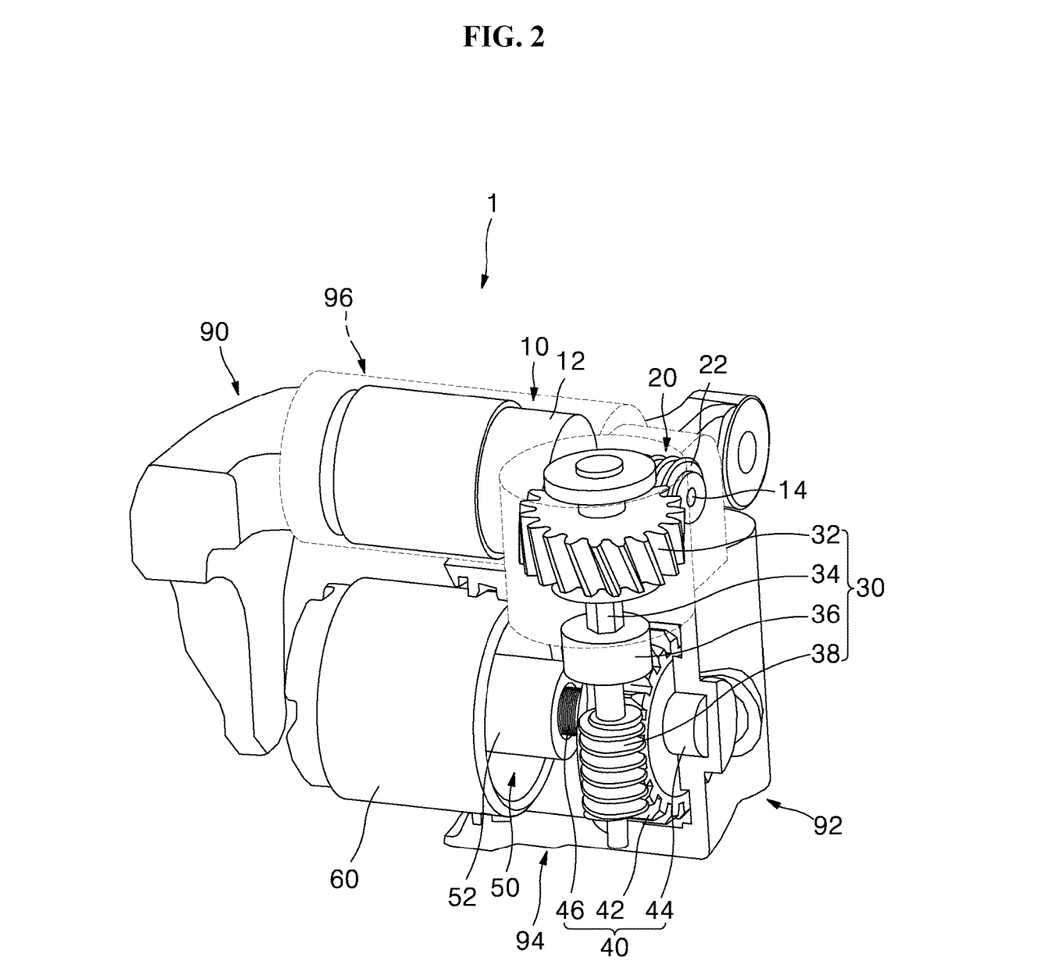
FIG. 2 is a perspective view schematically illustrating an installation state of a is second gear in accordance with an exemplary embodiment.
Figure 3:
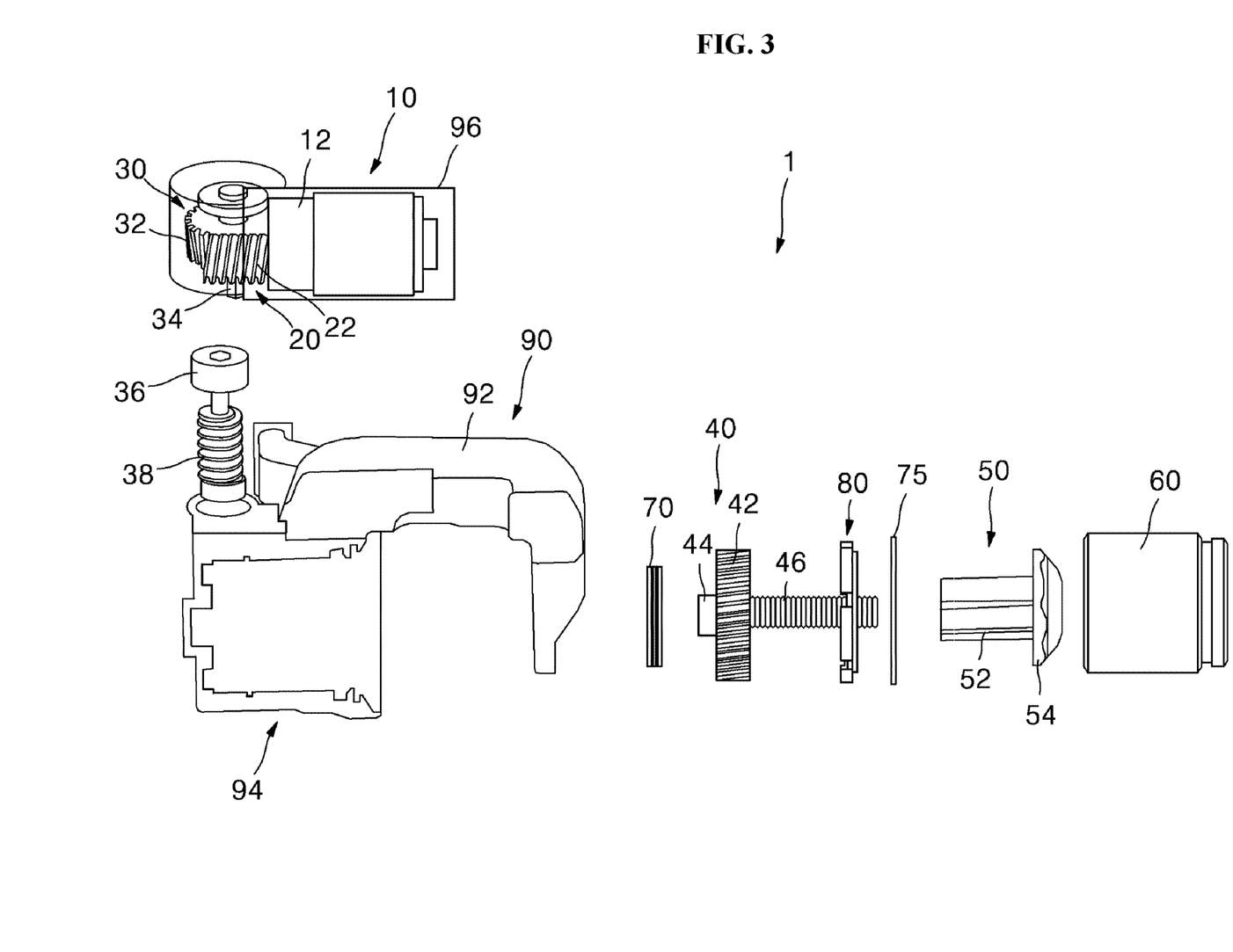
FIG. 3 is an exploded perspective view of the electro-mechanical brake device in accordance with an exemplary embodiment.
Figure 4:
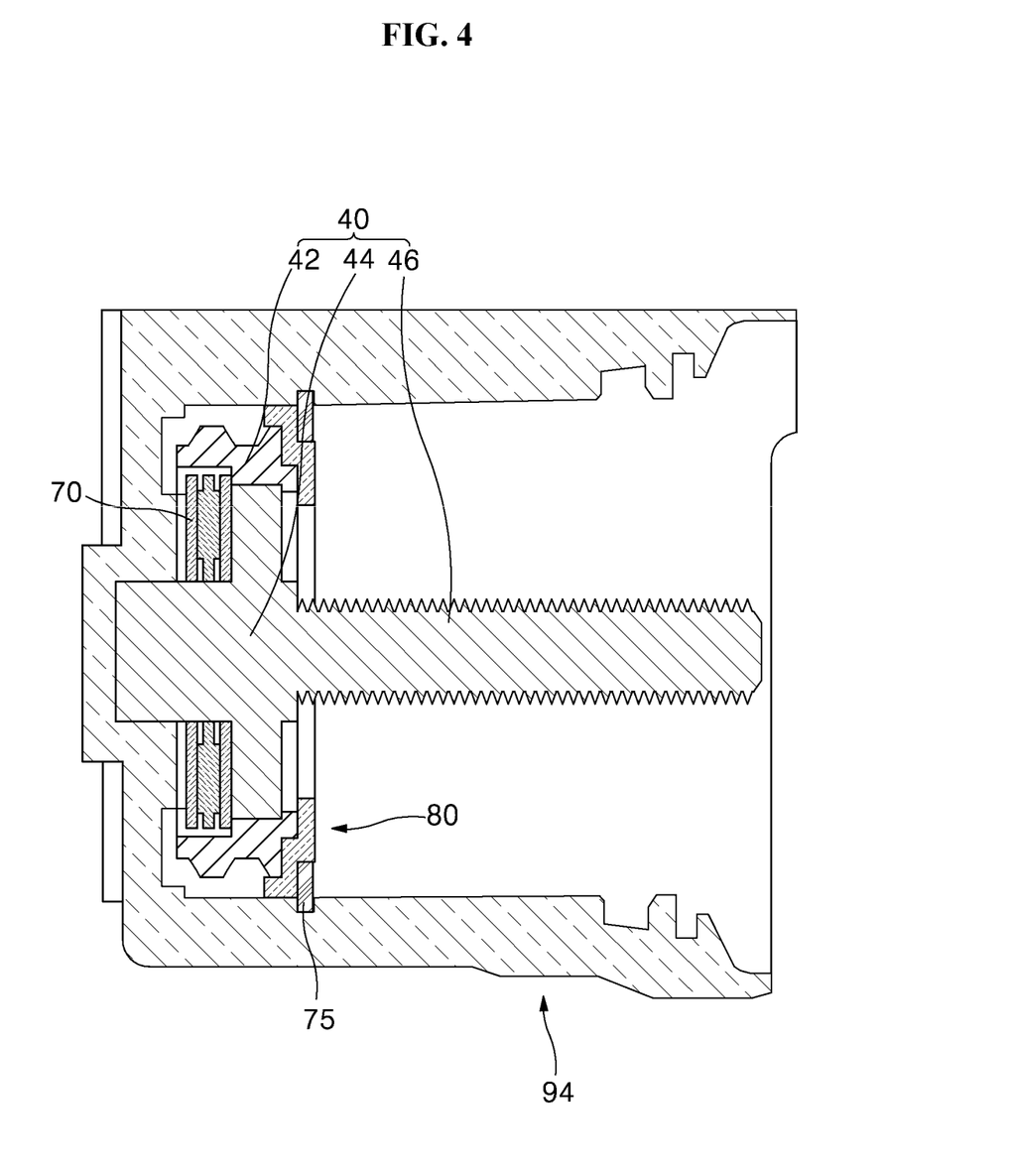
FIG. 4 is a cross-sectional view schematically illustrating an installation state of a third gear in accordance with an exemplary embodiment.
Figure 5:
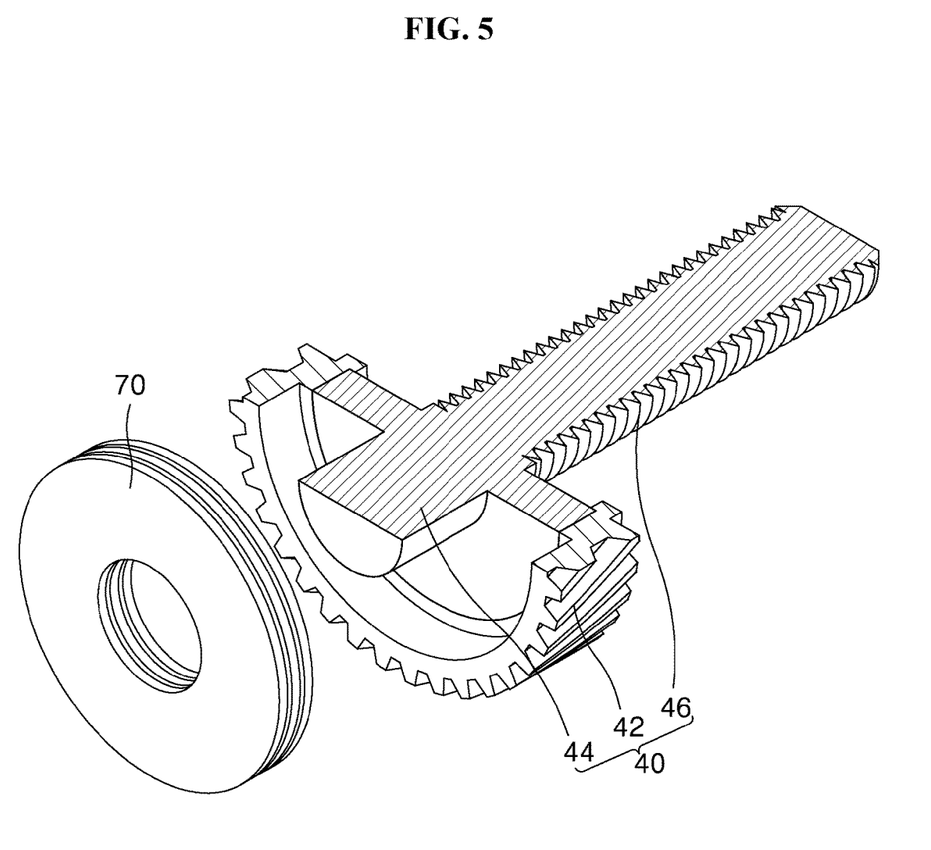
FIG. 5 is a perspective view schematically illustrating the third gear and a bearing member in accordance with an exemplary embodiment.
Figure 6:
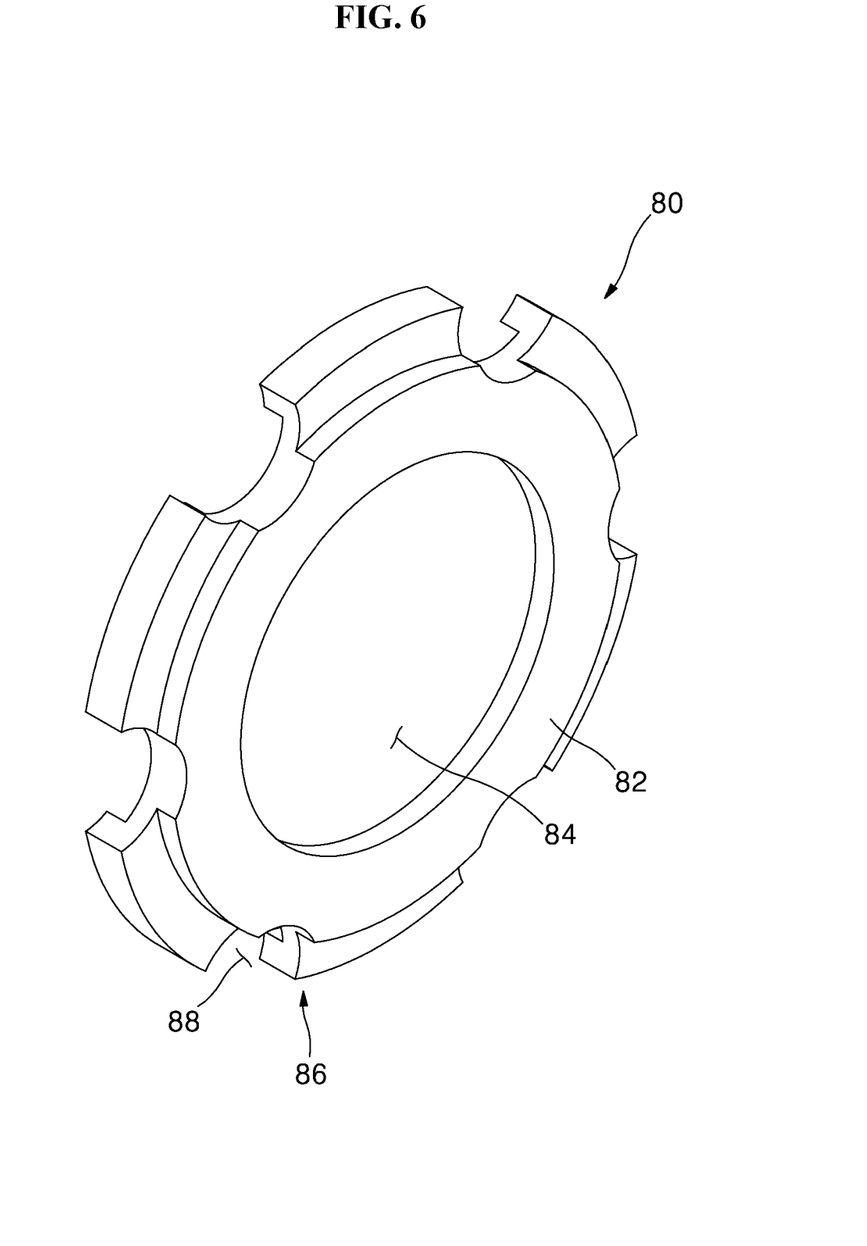
FIG. 6 is a perspective view illustrating a screw holder in accordance with an exemplary embodiment.

Exemplary embodiments described below, provide a structure that is less susceptible to damage. In particular, exemplary embodiments provide an electro-mechanical brake device configured to stably maintain a parking brake force when a vehicle is parked, thereby improving vehicle operation reliability FIG. 1 is a perspective view schematically illustrating an electro-mechanical brake device in accordance with an exemplary embodiment. FIG. 2 is a perspective view schematically illustrating an installation state of a second gear in accordance with an exemplary embodiment. FIG. 3 is an exploded perspective view of the electro-mechanical brake device in accordance with an exemplary embodiment of. FIG. 4 is a cross-sectional view schematically illustrating an installation state of a third gear in accordance with an exemplary embodiment. FIG. 5 is a perspective view schematically illustrating the third gear and a bearing member in accordance with an exemplary embodiment. FIG. 6 is a perspective view illustrating a screw holder in accordance with an exemplary embodiment.

As illustrated in FIGS. 1 to 3, the electro-mechanical brake device 1 in accordance with an exemplary embodiment includes a driver 10, a first gear 20, a second gear 30, a third gear 40, a moving nut 50, a piston 60, a bearing member 70, a fixed ring member 75, a screw holder 80 and a caliper 90. As illustrated in FIGS. 1 and 2, the caliper 90 forming the body of the electro-mechanical brake device 1 includes a caliper body 92 and a caliper cover 96.

The driver 10 may include various types of driving devices as long as the driving devices can generate rotary power to operate the electro-mechanical brake device 1.

Because the driver 10, in accordance with an exemplary embodiment, uses an electrical motor 12 and is positioned above the caliper body 92, the driver 10 can reduce the length of the electro-mechanical brake device 1 in the longitudinal direction thereof (side-to-side direction in FIG. 2). The driver 10 includes the electrical motor 12 and an output shaft 14 protruding in a lateral direction of the electrical motor 12. The output shaft 14 is horizontally installed above the caliper body 92.

The first gear 20 is connected to the output shaft 14 of the driver 10 and rotated with the output shaft 14. The first gear 20 in accordance with an exemplary embodiment includes a first worm gear 22 which is installed outside the output shaft 14 and extended in the horizontal direction.

The second gear 30 is installed in a direction crossing the first gear 20. Various types of gears may be used as the second gear 30, as long as the gears can be engaged and rotated with the first gear 20. The second gear 30 in accordance with an exemplary embodiment includes a first worm wheel gear 32, a connection member 36 and a second worm gear 38.

The first worm wheel gear 32 is engaged and rotated with the first gear 20, and has a rotating shaft 34 positioned in a vertical direction. The rotating shaft 34 of the first worm wheel gear 32 is installed in a vertical direction crossing the output shaft 14. The top portion of the rotating shaft 34 is extended upward through the center of rotation of the first worm wheel gear 32, and the bottom portion of the rotating shaft 34 has a polygonal cross-section.

The top portion of the rotating shaft 34 connected to the first worm wheel gear 32, and the bottom portion of the rotating shaft 34 is inserted into the connection member 36. The connection member 36 is rotated with the first worm wheel gear 32. The connection member 36 into which the rotating shaft 34 is inserted has a polygonal groove formed therein. Because the rotating shaft 34 has the same shape as the inner groove of the connection member 36, the connection member 36 is rotated together when the rotating shaft 34 is rotated with the first worm wheel gear 32. Thus, because the bottom portion of the rotating shaft 34 can be detachably connected to the connection member 36, the first worm wheel gear 32 or the second worm gear 38 can be separated and replaced when the first worm wheel gear 32 or the second worm gear 38 needs to be replaced, which may reduce a vehicle maintenance cost.

The second worm gear 38 is extended upward to the bottom of the connection member 36 and has a screw thread formed thereon. Thus, the second worm gear 38 is engaged with the third gear 40 and rotates the third gear 40. The first worm wheel gear 32 has a larger diameter than the second worm gear 38, and the second worm gear 38 is positioned under the first worm wheel gear 32.

As illustrated in FIGS. 3 to 5, the third gear 40 in accordance with an exemplary embodiment includes a second worm wheel gear 42, a gear support 44 and the rotating gear bar 46. The third gear 40 is engaged and rotated with the second gear 30, and has a rotating gear bar 46 installed in parallel to the output shaft 14. The rotating gear bar 46 is integrated with the third gear 40 and rotated with the third gear 40. Because the third gear 40 is rotatably installed in the caliper body 92, the third gear 40 can be stably protected from an external shock.

The second worm wheel gear 42 is installed in a ring shape, and engaged and rotated with the second worm gear 38. The second worm wheel gear 42 has a center axis of rotation parallel to the output shaft 14 of the electrical motor 12 in the horizontal direction. The second worm wheel gear 42 having gear teeth formed along a circumferential direction is engaged with the second worm gear 38 of the second gear 30 to receive power. The second worm wheel gear 42 may be installed in an auto-lock type by adjusting lead angles of screw threads of the second worm wheel gear 42 and the second worm gear 38 such that the second worm wheel gear 42 is not rotated by a frictional force when an external force is not received. On the other hand, the lead angles of the screw threads of the second worm wheel gear 42 and the second worm gear 38 may be adjusted in an anti-auto-lock type such that the second worm wheel gear 42 and the second worm gear 38 are easily rotated even when no external force is transmitted.

The gear support 44 supports the inside of the second worm wheel gear 42, and has a center axis of rotation connected to the rotating gear bar 46. One side of the gear support 44 is inserted into an operation space part 94 of the caliper 90, and the other side of the gear support 44 is connected to the rotating gear bar 46.

The rotating gear bar 46 is connected to the other side of the gear support 44, and connected to the center axis of rotation of the gear support 44 so as to extend in the horizontal direction. The rotating gear bar 46 is formed in a rod shape and has a male screw thread formed thereon. Because the second worm wheel gear 42, the gear support 44 and the rotating gear bar 46 are integrally injection-molded, the number of assembly processes can be reduced, and the entire length of the electro-mechanical brake device 1 can also be reduced.

As illustrated in FIG. 3, the moving nut 50 may be formed in various shapes as long as the moving nut 50 can be engaged with the rotating gear bar 46 of the third gear 40 and linearly moved. The moving nut 50 in accordance with an exemplary embodiment includes a nut body 52 and a locking member 54.

The nut body 52 into which the rotating gear bar 46 is inserted has an inner screw thread engaged with the rotating gear bar 46. The locking member 54 is extended to the outside from one side of the nut body 52 toward the piston 60, and restricted from rotating when locked to the inside of the piston 60. The locking member 54 has a plate shape, and is extended to the outside of the nut body 52 so as to be locked to the inside of the piston 60. Thus, because the locking member 54 is locked to the piston 60 and restricted from rotating when the rotating gear bar 46 is rotated, the moving nut 50 is linearly moved along the longitudinal direction of the rotating gear bar 46.

As illustrated in FIGS. 2 and 3, the piston 60 may be installed in a shape covering the outside of the moving nut 50, and formed in various shapes as long as the piston 60 can be pushed by the moving nut 50 so as to pressurize the brake pad 98. The piston 60 in accordance with an exemplary embodiment has a cylindrical shape with an entrance opened toward the second worm wheel gear 42. The moving nut 50 is positioned in the piston 60, and the piston 60 is pushed and moved by the moving nut 50.

As illustrated in FIGS. 3 and 5, the bearing member 70 is installed on the first side of the gear support 44 so as to reduce a frictional force. The bearing member 70 is installed between the gear support 44 and the operation space part 94 of the caliper 90, and reduces the frictional force which is generated while the gear support 44 rotated with the second worm wheel gear 42 comes in contact with the inside of the operation space part 94.

As illustrated in FIG. 4, on the second side of the gear support 44, the screw holder 80 and the fixed ring member 75 are sequentially installed along the longitudinal direction of the rotating gear bar 46. The screw holder 80 is installed on the second side of the gear support 44, and restricts the axial movement of the second worm wheel gear 42. The screw holder 80 may be modified into various shapes as long as the screw holder 80 can be fixed in the caliper body 92.

As illustrated in FIGS. 3 and 6, the screw holder 80 in accordance with an exemplary embodiment includes a holder body 82 and edge fixing parts 86.

The holder body 82 has a through-hole 84 through which the rotating gear bar 46 is passed and formed in a ring-shaped disk shape. The holder body 82 is installed in contact with side surfaces of the second worm wheel gear 42 and the gear support 44 along the longitudinal direction of the rotating gear bar 46, and restricts the lateral movements of the second worm wheel gear 42 and the gear support 44.

The edge fixing parts 86 form a plurality of air vent holes 88 along the outer circumferential surface of the holder body 82. The edge fixing parts 86 protrude from the holder body 82, and are locked and fixed to the inside of the operation space part 94. Because the plurality of air vent holes 88 are formed in the circumferential direction along the edge fixing parts 86, air contained in oil of the piston 60 can be easily discharged to the outside of the piston 60 through the air vent holes 88.

The caliper cover 96 is coupled to the caliper body 92 while covering the driver 10, the first gear 20, the second gear 30 and the third gear 40. The caliper body 92 is made of cast iron or aluminum, and the caliper cover 96 is formed of plastic.

Thus, because the parts capable of maintaining a parking force are positioned in the caliper 90 even though the caliper cover 96 is damaged, the damage of the parts by an external force can be reduced, while the parking force is maintained.

The caliper body 92 includes the operation space part 94 forming a space through which the moving nut 50 and the piston 60 are moved. The operation space part 94 is opened toward the direction in which the piston 60 is installed.

Hereafter, the operation of the electro-mechanical brake device 1 in accordance with an exemplary embodiment will be described with the accompanying drawings.

When the electrical motor 12 installed above the caliper 90 is operated to rotate the output shaft 14, the first worm gear 22 is rotated with the output shaft 14. When the first worm wheel gear 32 engaged with the first worm gear 22 is rotated with the rotating shaft 34, the connection member 36 into which the lower end of the rotating shaft 34 is inserted is rotated together.

When the second worm gear 38 connected to the bottom of the connection member 36 is rotated with the connection member 36, the rotating gear bar 46 is rotated while the second worm wheel gear 42 engaged with the second worm gear 38 is rotated.

Because the rotation of the moving nut 50 engaged with the rotating gear bar 46 is restricted, the moving nut 50 is moved in the longitudinal direction along the rotating gear bar 46. Because the movement of the moving nut 50 pressurizes the piston 60 to pressurize the brake pad 98, a parking brake force is formed.

In accordance with an exemplary embodiment, because the driver 10 is positioned above the caliper body 92 and does not protrude in the lateral direction, the exterior size of the electro-mechanical brake device 1 can be reduced, and the driver 10 can be mounted without a change in layout of the vehicle. Furthermore, because the driver 10, the first gear 20 and the second gear 30 are positioned in the caliper 90, damage caused by an external force can be prevented to stably maintain a parking brake force during parking, which may improve vehicle operation reliability. Furthermore, because the second worm wheel gear 42, the gear support 44 and the rotating gear bar 46 are integrated with each other, the number of parts can be reduced to improve the productivity, and the whole length of the parts can be reduced to improve the mounting performance.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electro-mechanical brake device comprising:
   a driver disposed above the caliper body and configured to generate rotary power;
   a first gear connected to an output shaft of the driver, and the first gear configured to rotate with the output shaft;
   a second gear installed in a direction crossing the first gear, engaged with the first gear, and configured to rotate with the first gear;
   a third gear engaged with the second gear and configured to rotate with the second gear, the third gear having a rotating gear bar installed in parallel to the output shaft and configured to rotate with the output shaft;
   a moving nut engaged with the third gear and configured to move linearly; and
   a piston installed in a cavity covering an outside of the moving nut, and pushed by the moving nut so as to pressurize a brake pad.

2. The electro-mechanical brake device of claim 1, wherein the driver comprises an electrical motor.

3. The electro-mechanical brake device of claim 2, further comprising a caliper cover coupled to the caliper body while covering the driver, the first gear, the second gear, and the third gear.

4. The electro-mechanical brake device of claim 2, wherein the first gear comprises a first worm gear which is installed outside the output shaft and extended in a horizontal direction.

5. The electro-mechanical brake device of claim 4, wherein the second gear comprises:
   a first worm wheel gear engaged with the first gear and configured to rotate with the first gear, the first worm wheel gear having a rotating shaft positioned in a vertical direction;
   a connection member into which the rotating shaft connected to the first worm wheel gear is inserted, the connection member configured to rotate with the first worm wheel gear; and
   a second worm gear extended to the bottom of the connection member and having a screw thread formed thereon so as to be engaged with the third gear.

6. The electro-mechanical brake device of claim 5, wherein a top portion of the rotating shaft is extended upward through a center of rotation of the first worm wheel gear, and a bottom portion of the rotating shaft has a polygonal cross-section.

7. The electro-mechanical brake device of claim 6, wherein the connection member has a polygonal groove formed therein, such that the bottom portion of the rotating shaft is inserted into the polygonal groove of the connection member.

8. The electro-mechanical brake device of claim 5, wherein the third gear comprises:
   a second worm wheel gear installed in a ring shape, engaged with the second worm gear, and configured to rotate with the second worm gear; and
   a gear support supporting the inside of the second worm wheel gear and having a center of rotation connected to the rotating gear bar.

9. The electro-mechanical brake device of claim 8, wherein the second worm wheel gear, the gear support and the rotating gear bar are integrated with each other through injection molding.

10. The electro-mechanical brake device of claim 8, further comprising:
    a bearing member installed on a first side of the gear support so as to reduce a frictional force; and
    a screw holder installed on a second side of the gear support and fixed to the inside of the caliper body while restricting an axial movement of the second worm wheel gear,
    wherein the third gear is rotatably installed in the caliper body.

11. The electro-mechanical brake device of claim 10, wherein the screw holder comprises:
    a holder body having a through-hole through which the rotating gear bar is passed, and formed in a ring shape; and
    edge fixing parts forming a plurality of air vent holes along an outer circumferential surface of the holder body.

12. The electro-mechanical brake device of claim 1, wherein the moving nut comprises:

a nut body into which the rotating gear bar is inserted, the nut body having an inner screw thread engaged with the rotating gear bar; and a locking member extended to the outside from one side of the nut body toward the piston, and restricted from rotating when locked to the inside of the piston.

13. The electro-mechanical brake device of claim 12, wherein when the rotating gear bar is configured to rotate, the locking member is locked to the piston and restricted from rotating, and the moving nut is linearly moved along the longitudinal direction of the rotating gear bar.

* * * * *